Patented Mar. 2, 1926.

1,574,875

UNITED STATES PATENT OFFICE.

MAX ENDERLI, OF OESTRICH, GERMANY, ASSIGNOR TO FIRM OF RUDOLPH KOEPP & CO., CHEMISCHE FABRIK, OF OESTRICH, GERMANY.

MANUFACTURE OF SODIUM FORMATE FROM CARBON MONOXIDE.

No Drawing. Original application filed February 24, 1921, Serial No. 447,623. Patent No. 1,555,796, dated September 29, 1925. Divided and this application filed February 28, 1923. Serial No. 621,923.

(GRANTED UNDER THE PROVISIONS OF THE ACT OF MARCH 3, 1921, 41 STAT. L., 1313.)

*To all whom it may concern:*

Be it known that I, MAX ENDERLI, a citizen of Switzerland, residing at Oestrich, Rheingau, Germany, have invented certain new and useful Improvements in the Manufacture of Sodium Formate from Carbon Monoxide (for which I have filed applications in Germany, March 3, 1919, and Austria, March 31, 1919), of which the following is a specification.

This invention relates to the manufacture of sodium formate and is a division of my application Serial No. 447,623 filed February 24, 1921, which has matured into Patent No. 1,555,796 Sept. 29, 1925.

The present invention has for its object the provision of a novel and improved method or process for the manufacturing of sodium formate.

According to the disclosure in the application above noted, sodium formate is produced by allowing carbon monoxide to react at a high temperature upon a solution of sodium sulfate in the presence of solid basic sodium calcium sulfate, solid calcium hydroxide, and solid calcium sulfate. Owing to the presence of this solid basic substance the concentration of the solution in sodium sulfate is automatically maintained at a low percentage which is favorable for the reaction and varies only with the temperature. It amounts at an ordinary working temperature of 170° C., for instance, to 7%.

According to this invention the process is carried out with still lower sulfate concentrations, whereby the reaction may be still more accelerated than according to the first process described in the above noted application.

The method or process consists in causing carbon monoxide to react with sodium sulfate mixed with a hydroxide of an alkaline earth metal and water, the degree of concentration of the sodium sulfate in the reaction vessel being kept below the saturation point of the basic sodium calcium sulfate, and care being taken to replace the sulfate consumed. Thus, for example a 5% to 6% solution of sodium sulfate mixed with several times the equivalent quantity of a hydroxide of an alkaline earth metal is treated with carbon monoxide, the sulfate absorbed by the reaction being replaced by the addition of concentrated sodium sulfate solution or of solid salt. Instead of the sulfate, substances may be used which contain the same or will form it, these substances being, for example, calcium sodium sulfate or basic sodium calcium sulfate. It is not necessary to maintain a supply of the alkaline earth metal hydroxide in the reaction vessel, but it may be placed therein while the process is going on. This is conveniently done by supplying it in the form of a mixture with the sulfate or the sulfate-forming substances which must also be added to the reaction vessel.

For example, a 5% solution of sodium sulfate and three or four times its equivalent quantity of caustic lime is submitted to the action of carbon monoxide at a temperature of from 160 to 170° C. As the conversion takes place the sulfate is replaced by introducing into the reaction vessel solid salt or salt in a highly concentrated aqueous solution or suspension, care always being taken that the concentration of the sulfate in the mixture does not exceed the most favorable degree which in this case is from 5% to 6%.

Compared with the manner of working the invention by producing formates from basic sodium calcium sulfate as described in the above mentioned application, the present invention has the advantage that the process may be carried out at a still lower degree of concentration of the sulfate within any desired limits down to the utmost practical dilution. This method, therefore, renders it possible to increase the rapidity of reaction by 15% or more, whereas compared with the previously known process in which sodium formate was obtained by carbon monoxide reacting upon sodium sulfate mixed with an equivalent quantity of milk of lime, the rapidity of reaction is increased by 50% or more. The method has, furthermore, the particular advantage that the conversion of the sodium compound from a sulfate into a formate is quantitative.

Owing to the fact that sodium formate has practically no influence upon the reacting capability of the solution contrary to the effect of sodium sulfate, the invention permits a very profitable utilization of weak formate solutions, for instance of lixiviation from the formate manufacture. This water may be introduced into the process for the production of formate instead of ordinary water to be transformed into concentrated formate solutions by saturation with the newly formed formate.

I claim:

1. A process for the manufacturing of sodium formate consisting in causing carbon monoxide to act upon strongly diluted sodium sulfate solutions in the presence of alkali earth metal hydroxide, and replacing the converted sodium sulfate by addition of fresh sodium sulfate in such quantities that a constant low sodium sulfate concentration is maintained which is below the saturation concentration of the basic sodium calcium sulfate for the corresponding temperature.

2. A process for the manufacturing of sodium formate consisting in causing carbon monoxide to act upon strongly diluted sodium sulfate solutions in the presence of alkali earth metal hydroxide, and replacing the converted sodium sulfate by addition of fresh sodium sulfate in such quantities that a constant low sodium sulfate concentration is maintained which is below the saturation concentration of the basic sodium calcium sulfate for the corresponding temperature, the supply of carbon monoxide being continued until concentrated formate solutions have been produced.

3. A process for the manufacturing of sodium formate consisting in causing carbon monoxide to act upon strongly diluted sodium sulfate solutions in the presence of alkali earth metal hydroxide, and replacing the converted sodium sulfate by addition of fresh sodium sulfate in such quantities that a constant low sodium sulfate concentration is maintained which is below the saturation concentration of the basic sodium calcium sulfate for the corresponding temperature and in replenishing also the alkali earth metal hydroxide.

4. A process for the manufacturing of sodium formate consisting in causing carbon monoxide to act upon strongly diluted sodium sulfate solutions in the presence of alkali earth metal hydroxide, in replacing the converted sodium sulfate in such a manner that a constant low sodium sulfate concentration is maintained which is below the saturation concentration of the basic sodium calcium sulfate for the corresponding temperature and in replenishing the alkali earth metal hydroxide, the supply of carbon monoxide being continued until concentrated formate solutions have been produced.

5. A process for the manufacturing of sodium formate consisting in causing carbon monoxide to act upon strongly diluted sodium sulfate solutions in the presence of alkali earth metal hydroxide, and replacing the converted sodium sulfate by the addition of substances which generate sodium sulfate in such quantities that a constant low sodium sulfate concentration is maintained which is below the saturation concentration of the basic sodium calcium sulfate for the corresponding temperature.

6. A process for the manufacturing of sodium formate consisting in causing carbon monoxide to act upon strongly diluted sodium sulfate solutions in the presence of alkali earth metal hydroxide, and replacing the converted sodium sulfate by the addition of basic sodium calcium sulfate in such quantities that a constant low sodium sulfate concentration is maintained which is below the saturation concentration of the basic sodium calcium sulfate for the corresponding temperature.

7. A process for the manufacturing of sodium formate consisting in causing carbon monoxide to act upon strongly diluted sodium sulfate solutions in the presence of alkali earth metal hydroxide, and replacing the converted sodium sulfate by addition of solutions of sodium sulfate in diluted formate solution in such quantities that a constant low sodium sulfate concentration is maintained which is below the saturation concentration of the basic sodium calcium sulfate for the corresponding temperature.

In testimony whereof I affix my signature.

Dr. MAX ENDERLI.